US007559744B2

(12) United States Patent
Suzuki et al.
(10) Patent No.: US 7,559,744 B2
(45) Date of Patent: Jul. 14, 2009

(54) PROPELLER FAN FOR HEAT EXCHANGER OF IN-VEHICLE AIR CONDITIONER

(75) Inventors: Atsushi Suzuki, Aichi-ken (JP); Tetsuo Tominaga, Hyogo-ken (JP); Tsuyoshi Eguchi, Hyogo-ken (JP); Kazuyuki Kamiya, Nagoya (JP); Asuka Soya, Nagoya (JP)

(73) Assignee: Mitsubishi Heavy Industries Ltd., Tokyo (JP)

( * ) Notice: Subject to any disclaimer, the term of this patent is extended or adjusted under 35 U.S.C. 154(b) by 90 days.

(21) Appl. No.: 11/366,029

(22) Filed: Mar. 2, 2006

(65) Prior Publication Data

US 2007/0031257 A1 Feb. 8, 2007

(30) Foreign Application Priority Data

Aug. 3, 2005 (JP) ............................ 2005-225854
Aug. 3, 2005 (JP) ............................ 2005-225855

(51) Int. Cl.
*B64C 11/00* (2006.01)

(52) U.S. Cl. .................................. 416/169 A; 415/223

(58) Field of Classification Search ............. 416/236 A, 416/236 R, 175, 169 A; 415/208.1, 223
See application file for complete search history.

(56) References Cited

U.S. PATENT DOCUMENTS 4,128,363 A * 12/1978 Fujikake et al. ......... 416/236 A
4,265,596 A * 5/1981 Katagiri et al. ......... 416/236 A
4,522,160 A 6/1985 Speers et al.
5,520,513 A * 5/1996 Kuroki et al. ............... 415/223
6,113,353 A * 9/2000 Sato et al. .................... 416/232
6,450,760 B1 * 9/2002 Furukawa et al. ........... 415/119
6,595,744 B2 * 7/2003 Van Houten ............ 416/223 R

FOREIGN PATENT DOCUMENTS

| | | |
|---|---|---|
| JP | 5-321893 | 12/1993 |
| JP | 8-170599 | 7/1996 |
| JP | 10-227295 | 8/1998 |
| JP | 2001-349300 | 12/2001 |
| JP | 3467815 | 11/2003 |
| JP | 2004-176702 | 6/2004 |
| JP | 2004-218513 | 8/2004 |
| JP | 2005-90336 | 4/2005 |

OTHER PUBLICATIONS

Chinese Office Action dated Dec. 14, 2007, Application No. 200610054741.3.

* cited by examiner

*Primary Examiner*—Igor Kershteyn
(74) *Attorney, Agent, or Firm*—Westerman, Hattori, Daniels & Adrian, LLP.

(57) ABSTRACT

There is provided a propeller fan in which a clearance between a rotary vane wheel and a shroud is constant three-dimensionally to improve air blowing efficiency and suppress noise. Furthermore, there is provided a propeller fan in which a span length of the rotary vane wheel with respect to the shroud is varied between a front edge portion and a rear edge portion to improve air blowing efficiency and suppress noise. Still further, there is provided a propeller fan characterized in that chamfering is applied only to a negative pressure face of a circumferential outer edge portion of a vane.

6 Claims, 9 Drawing Sheets

PROPELLER FAN FOR HEAT EXCHANGER OF IN-VEHICLE AIR CONDITIONER

CROSS-REFERENCE TO RELATED APPLICATIONS

This application is based upon and claims the benefit of priority from Japanese Patent Applications No. 2005-225854 and No. 2005-225855, both filed on Aug. 3, 2005, the entire contents of which are incorporated herein by reference.

BACKGROUND OF THE INVENTION

1. Field of the Invention

The present invention relates to a propeller fan provided in the vicinity of a heat exchanger of an in-vehicle air conditioner. More particularly, the present invention relates to a propeller fan capable of improving ventilation efficiency and reducing noise in an in-vehicle heat exchanger such as a radiator and a condenser.

2. Description of the Related Art

A propeller fan for vehicle such as a fan of a radiator for vehicle and a fan for cooling a condenser of in-vehicle air conditioner is generally composed of a rotary vane wheel and a shroud casing. These propeller fans are required to be placed into a narrow engine room and to have lightweight. This requires the propeller fans to be downsized in depth dimension in a flow direction. Furthermore, the radiator and the condenser to be cooled are required to be small and to have a high heat exchanging performance. This makes ventilation resistance large, so that the propeller fan for vehicle is in an operating condition of a high static pressure difference. In such a high static pressure type propeller fan with a casing, it is known that a clearance dimension between the casing and a rotary vane tip (tip clearance, hereinafter, merely referred to as clearance) is an important dimension which exerts an influence on air blowing performance, efficiency and noise.

Conventionally, for the clearance, there has been a technique of protruding rotary vanes on the upstream side of a bell mouth in order to efficiently take in a centripetal flow. Furthermore, there have been provided various techniques, such as a technique of integrating a ring bell mouth with rotary vanes in order to make the clearance zero for the purpose of corresponding to the operation condition of high static pressure (for example, Japanese Patent Application Laid-Open No. 2004-176702).

Furthermore, as described above, the propeller fan cannot have a large dimension in the depth direction (thickness direction). Therefore, a shroud cross-sectional shape from a rectangular radiator and the like to a circular fan inlet port changes precipitously, which remarkably limits an air rectification effect. Particularly, in the bell mouth portion provided at the fan inlet portion is often constructed with an angle R of a small radius R (chamfering). Therefore, most air passing through the rectangular radiator or the like easily becomes a centripetal flow toward the center portion of the fan by inertial force. This reduces an effective radius of the fan. Furthermore, this leads to deterioration of air blowing performance, and efficiency and increase of noise.

In order to avoid the above-described deterioration of the air blowing performance and the like, there has been conventionally applied a bell mouth having an elliptic angle R or a bell mouth in which a main portion of a bell mouth is constructed with a relatively large angle R and only a portion thereof interfering with a propeller fan has a small angle R (for example, Japanese Patent Application Laid-Open No. 2001-349300).

However, even in the above-described techniques, no sufficient effect cannot be obtained, and has an adverse effect that discrete frequency noise caused by interaction between the rotary vane wheel of the propeller fan and the shape of the shroud is prominent, and so on. Furthermore, although the above-described techniques have an effect of improving the individual performance of air blowing characteristics, efficiency or the like, there has been provided no effective technique that can improve all of the air blowing characteristics, efficiency and suppression ratio of noise in a balanced manner.

SUMMARY OF THE INVENTION

An object of the present invention is to solve at least the above-described problems.

According to one aspect of the present invention, a propeller fan includes a rotary vane wheel of an axial-flow type having a plurality of vanes disposed radially around a hub; and a shroud disposed surrounding the rotary vane wheel in a circumferential direction thereof, having a bell mouth shape in an air path where air sucked by the rotary vane wheel flows, and providing a rectangular sucking port on an inlet side of the bell mouth shape, wherein a clearance between circumferential outer edges of the vanes and the air path of the bell mouth shape is kept constant along the bell mouth shape.

According to another aspect of the present invention, a propeller fan includes a rotary vane wheel of an axial-flow type having a plurality of vanes disposed radially around a hub; and a shroud disposed surrounding the rotary vane wheel in a circumferential direction thereof, having a bell mouth shape in an air path where air sucked by the rotary vane wheel flows, and providing a rectangular sucking port on an inlet side of the bell mouth shape, wherein a span length of a portion of each of the vanes that traverses the bell-mouth-shaped portion is larger than a span length of a portion of the vane that does not traverse the bell-mouth-shaped portion.

According to still another aspect of the present invention, a propeller fan includes a rotary vane wheel of an axial-flow type having a plurality of vanes disposed radially around a hub; and a shroud disposed surrounding the rotary vane wheel in a circumferential direction thereof while ensuring a constant clearance, wherein a chamfering is applied only to a negative pressure face of a circumferential outer edge portion of each of the vanes.

According to still another aspect of the present invention, a propeller fan includes a rotary vane wheel of an axial-flow type; and a shroud placed downstream of an in-vehicle heat exchanger, in which a shape of an air path transits from a substantially rectangle to a circle, the rotary vane wheel is provided at a portion where the shape of the air path becomes the circle, wherein from a vane surface on the negative pressure side of the rotary vane wheel at a position on a concentric circle with the circle of the air path of the shroud, a plate-like protrusion is provided toward an axial direction of the rotary vane wheel in parallel to, or with such an angle as to form a taper with respect to, an inner wall of the air path in a portion of the shroud surrounding the rotary vane wheel in the circumferential direction.

The foregoing, other objects, characteristics, advantages, and technical and industrial significance will be further understood by reading the after described detailed description of the present invention with reference to the accompanying drawings.

DETAILED DESCRIPTION OF THE PREFERRED EMBODIMENTS

Figure 1:
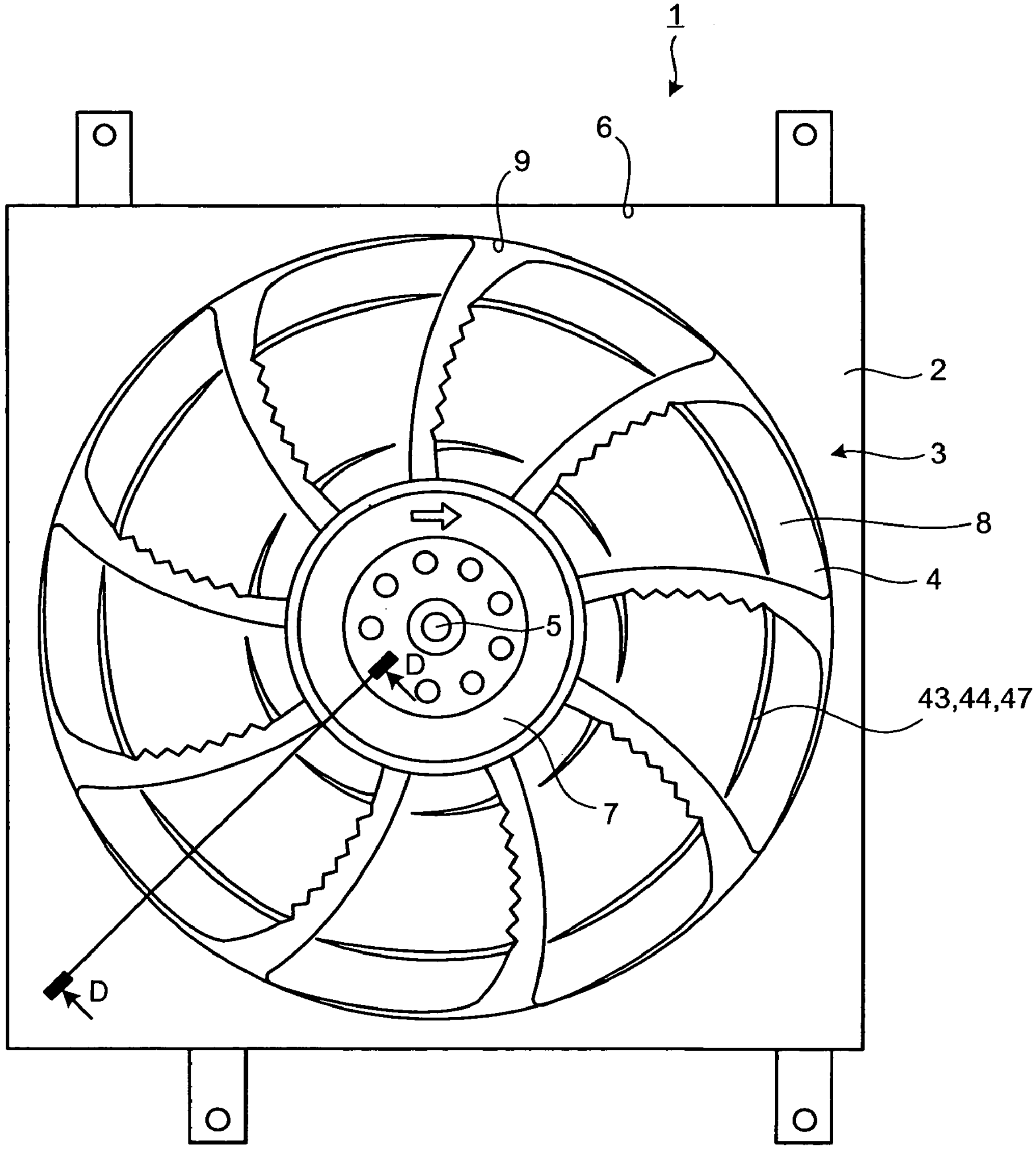
FIG. 1 is a front view showing an entire propeller fan.

FIG. 1 is a front view showing an entire propeller fan. A propeller fan 1 is mainly composed of an axial-flow type rotary vane wheel 3 and a shroud 2. The shroud 2 surrounds the rotary vane wheel 3 in a circumferential direction and forms an air path. The rotary vane wheel 3 is composed of a hub 7 and vanes 8 (nine vanes in the figure) attached to the hub 7 radially. The vanes 8 rotate clockwise on the paper face in the figure, centering on an axial center 5. Thereby, the rotary vane wheel 3 works so as to push out the air rearwards from the front of the paper face.

On an upstream of the shroud 2 (in the front of the paper face), a heat exchanger such as a radiator for vehicle and a condenser of an in-vehicle air conditioner is provided. Most of the radiators for vehicle are rectangular because of its structure. On the other hand, in the case where the radiator is cooled by using the axial-flow type rotary vane wheel 3, the air path should be circular. Therefore, the air path formed by the shroud 2 is rectangular at an inlet 6 (in the front of the paper face) and is circular at an outlet 9. A bell mouth shape (trumpet shape) is utilized for transition from the rectangle to the circle.

Figure 2:
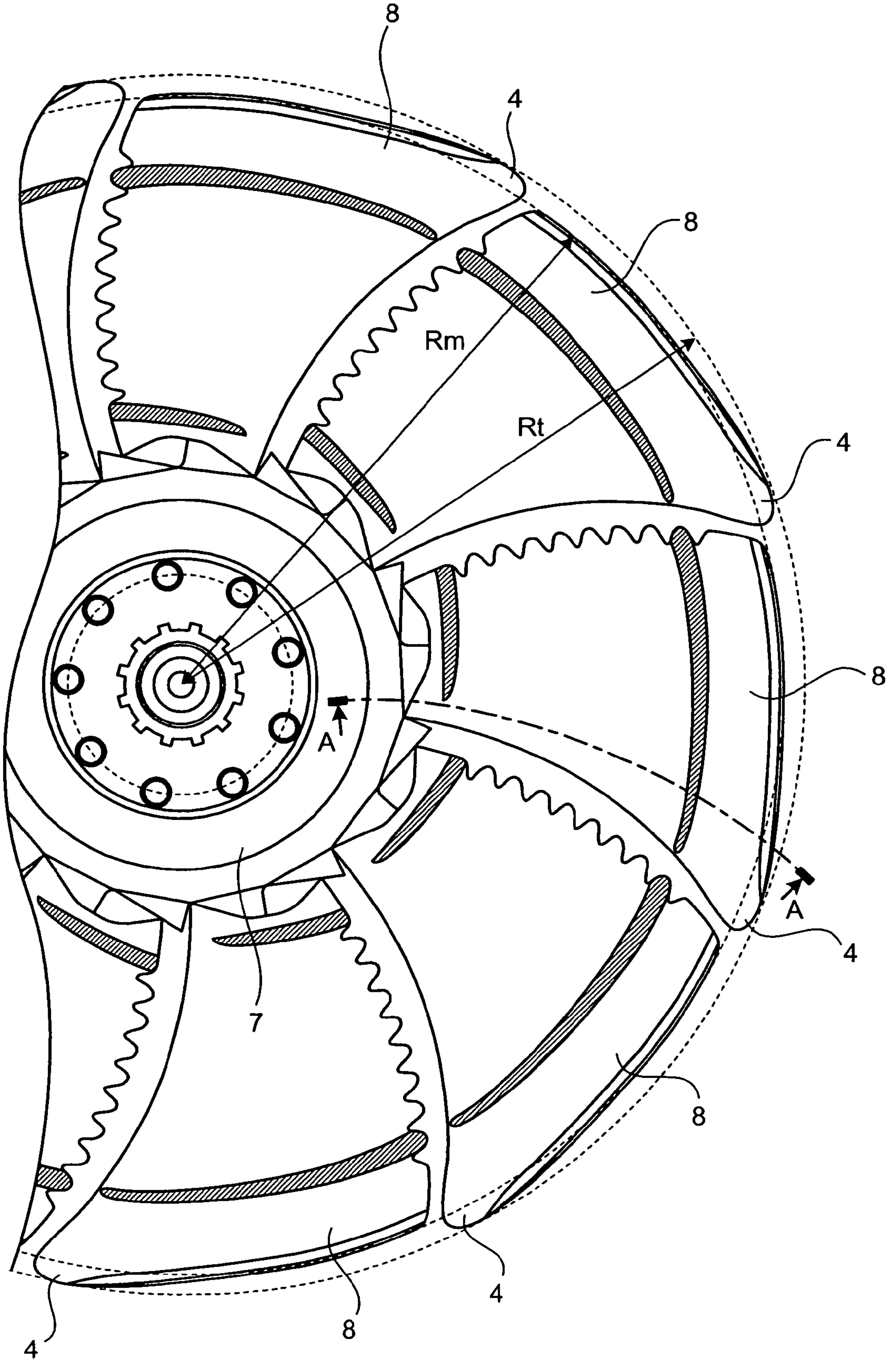
FIG. 2 is a front view showing a shape of vanes of a rotary vane wheel.

FIG. 2 is a front view showing a shape of vanes of the rotary vane wheel. As shown in the figure, this invention is characterized in that a span length Rt of a portion of each of the vanes 8 that traverses the bell mouth portion is larger than a span length Rm of a portion of the vane 8 that does not traverse the bell mouth portion. This characteristic is, in other words, that a clearance between a circumferential outer edge of the vane 8 and the above-described bell-mouth-shaped air path is constant along the bell mouth shape. The portion that does not traverse the bell mouth portion means a portion that traverses a portion in a cylindrical or conical taper shape where the shape transition from the rectangle to the circle in the bell mouth ends.

Figure 3:
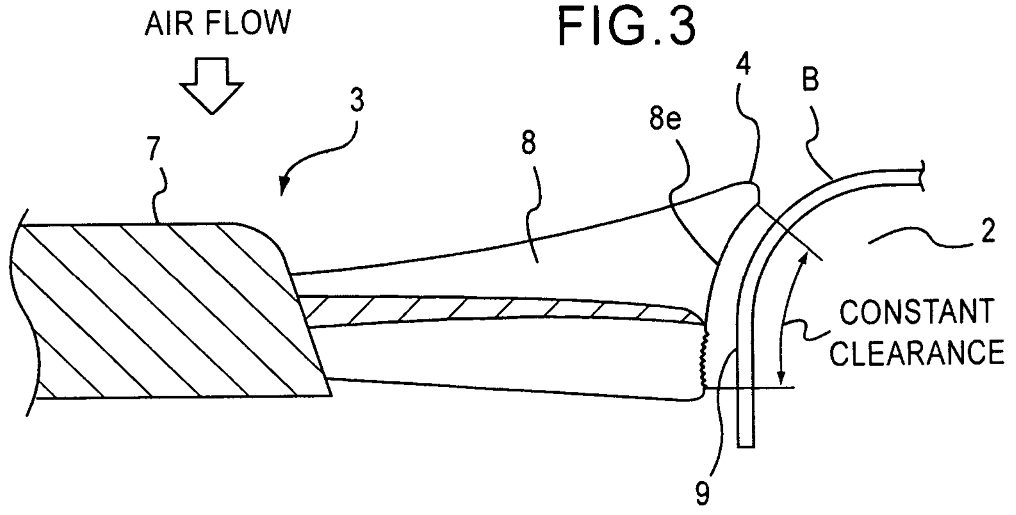
FIG. 3 is a cross-sectional view showing a cross section taken along the line A-A of FIG. 2.

FIG. 3 is a cross-sectional view showing a cross section taken along the line A-A of FIG. 2. As shown in FIG. 3, the vanes 8 are provided radially inside of the outlet 9 of the air path formed by the shroud 2. An inner wall of the outlet 9 and a circumferential outer edge end 8*e* of the vane 8 uniformly have a clearance of a constant length therebetween. This figure is a cross-sectional view taken with a certain cross section, which makes it difficult to grasp a three-dimensional distance between the vane 8 and the outlet inner wall 9. In the figure, however, assuming that a semicircular doughnut-shaped body lies in the back direction of the paper face and that inside of the doughnut-shaped body, the circumferential outer edge ends 8*e* of the vanes 8 of the rotary vane wheel 3 are located uniformly at the constant distance from the inner wall of the doughnut-shaped body will promote understanding.

The axial-flow type rotary vane wheel 3 is typically arranged in the cylindrical portion of the air path. In the present invention, the rotary vane wheel 3 is arranged so as to be opposed to, and traverse, a portion that transits to a bell mouth shape B of the air path. Furthermore, the clearance between the air path of the bell mouth shape B and a front vane portion 4 of the circumferential outer edge end of the vane 8 is constant three-dimensionally. With this, there can be constructed a propeller fan that can efficiently perform sucking from the diagonal direction of the rectangular shape, which has been a problem, even in use at a place with a large static pressure, such as downstream of the heat exchanger. It is because more air from the diagonal direction of the rectangular shape can be pushed downstream. Also, the clearance can be narrowed and be constant, which makes it difficult for the air to flow back.

Figure 8:
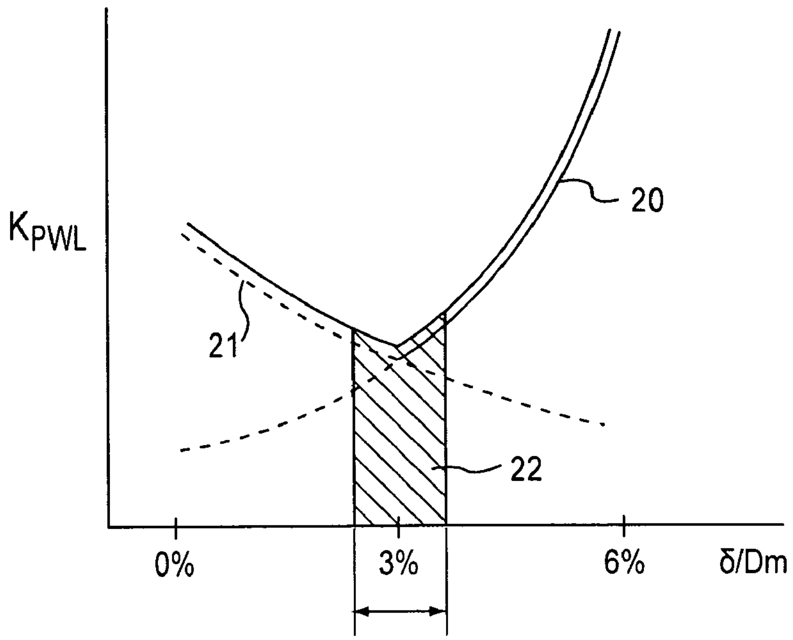
FIG. 8 is a graph showing a relationship between a tip extension ratio and an acoustic power specific noise level of a BPF component and a relationship between the tip extension ratio and an acoustic power specific noise level of overall noise, with the horizontal axis indicating the tip extension ratio and the vertical axis indicating a specific noise level value of the acoustic power of the BPF component and a specific noise level value of the acoustic power of the overall noise.

FIG. 8 is a graph showing a relationship between a tip extension ratio and a specific noise level of BPF component acoustic power, and a relationship between the tip extension ratio and a specific noise level of overall noise power in a condition of a constant air volume, with the horizontal axis indicating the tip extension ratio and the vertical axis indicating the specific noise level value $K_{PWL}$ of the acoustic power of the BPF component and the specific noise level value $K_{PWL}$ of the overall noise. If (Rt−Rm) in FIG. 2 is δ and a diameter of the rotary vane wheel is Dm, δ/Dm is the tip extension ratio. A curve 20 is a curve of the BPF (Brade Passing Frequency) component acoustic power level, and an acoustic power sum level of a specific frequency component is generated by the correlation between the shape of the shroud the inlet of which is rectangular and the rotary vane wheel. This means that as the tip extension ratio δ/Dm becomes larger, the acoustic power level becomes higher and thus the noise increases.

Furthermore, the curve 21 is an acoustic power curve of the overall noise, and this curve indicates an acoustic power level of overall noise by integrating acoustic power levels of various frequency components detected at a certain place when the rotary vane wheel is rotated. This overall value tends to become smaller as the tip extension ratio δ/Dm becomes larger. Accordingly, the tip extension ratio δ/Dm that reduces this BPF component and the overall value in such a balanced manner is ideal, which was found to be approximately 3%.

Figure 9:
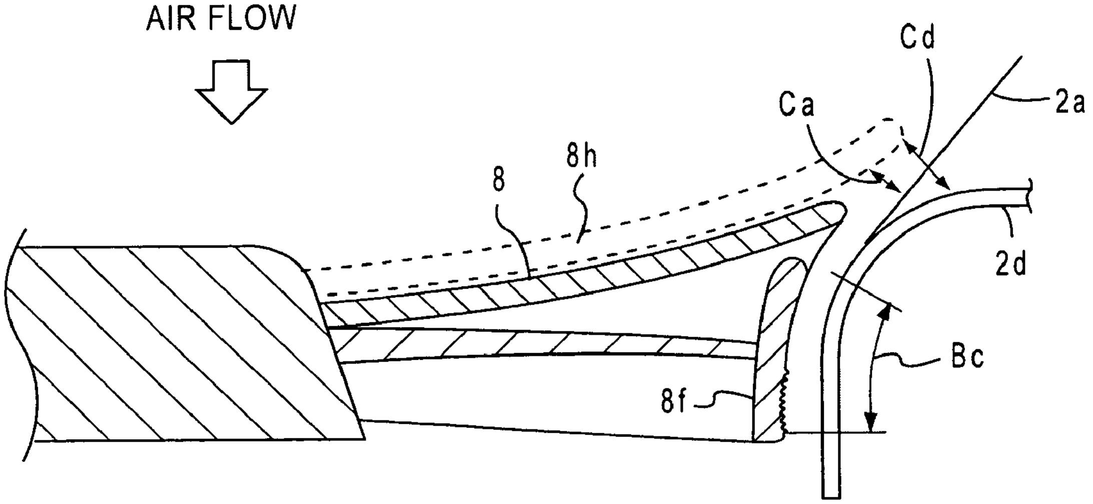
FIG. 9 is a cross-sectional view showing a cross-sectional shape of the vane and air path.

In the case of a propeller fan that has difficulty having a large depth dimension (thickness dimension) and has a rectangular air sucking port, an inclination of the air path in an axial cross-sectional shape (inclination with respect to the axial direction of the rotary vane wheel) is different between a direction that passes the center of the rectangle and is parallel to the axis of the rectangle (hereinafter, merely referred to as axial direction of the rectangle) and a diagonal direction. FIG. 9 is a cross-sectional view showing a cross-sectional shape of the vane and the air path. More particularly, an inclination 2*a* of the air path in the axial direction of the rectangle with respect to the axial direction of the rotary vane wheel is smaller than an inclination 2*d* of the air path in the diagonal direction. Accordingly, in the propeller fan according to the embodiment of this invention, a vane circumferential outer edge end 8*f* which is a portion traversing the bell mouth portion is extended in the span direction and the clearance with respect to the inner wall of the air path is kept constant. Furthermore, because of the above-mentioned difference in the inclination, in the propeller fan, the span of the vane needs to be caused to conform to the inclination 2*a* in the axial direction of the rectangle. If the vane is extended in the span direction so as to conform to the inclination 2*d* in the diagonal direction, the vane 8 and the air path will interfere with each other in the axial direction of the rectangle.

However, even if the span of the vane is caused to conform to the inclination 2*a* of the air path in the cross section, which is in the axial direction of the rectangle, when a vane 8*h* is located so that the circumferential outer edge end traverses the bell mouth portion in a larger way (in the axial direction), for example, at a position indicated by a dashed line, the clearance is varied while the vane 8*h* is making a circle. Namely, a clearance Cd when the vane 8*h* traverses the air path in the diagonal direction will be larger than a clearance Ca when the vane 8*h* traverses in the axial direction of the rectangular. This is because the inclination on the inlet side relative to the bell mouth differs.

Consequently, the circumferential outer edge region 8*f*, where the clearance becomes constant in opposition to a bell mouth region Bc which is an inner wall with a curvature shared by both of the axial direction of the rectangle and the diagonal direction in the shape of the air path, is adapted to have a width of 50% chord or more from a vane downstream end. With this, the region where the clearance in a full circle of the vane is constant whether it is in the axial direction of the rectangle or in the diagonal direction exceeds half or more of the vane. A reduction in variation of the clearance in a full circle of the vane can bring about the improvement on air blowing characteristics and efficiency and reduction in noise.

Figure 4:
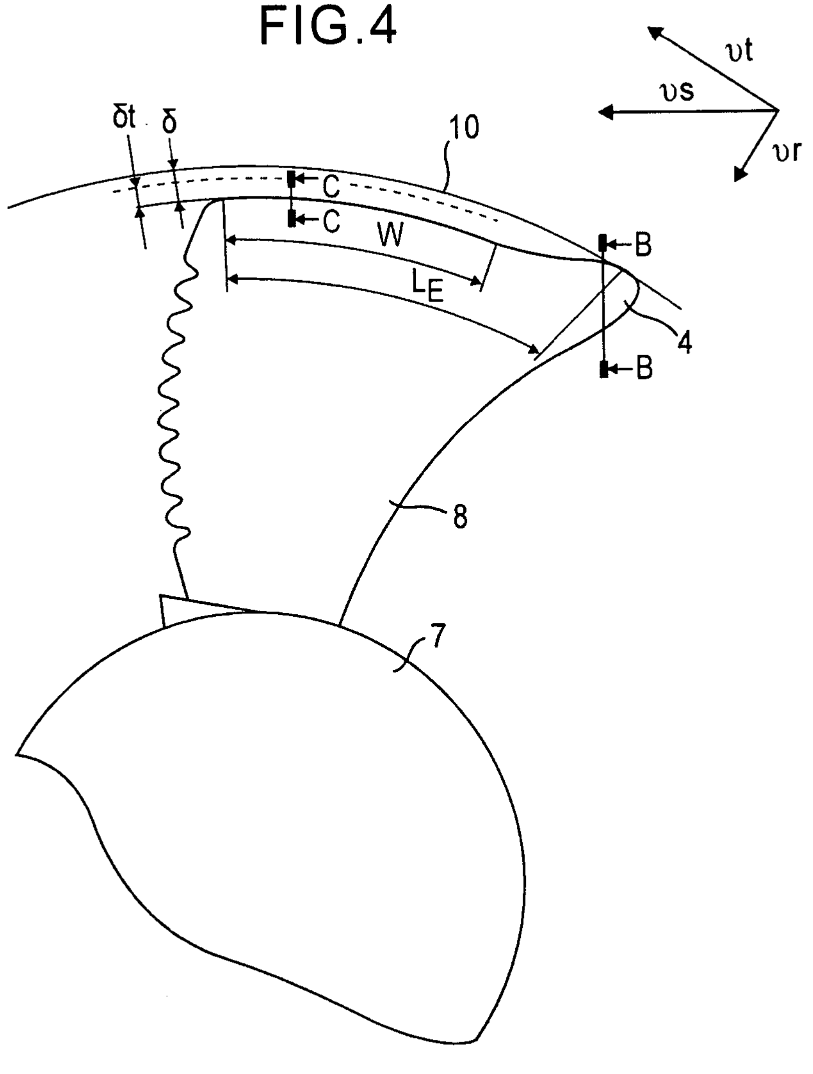
FIG. 4 is an explanatory view showing a region of a circumferential outer edge of a vane where a clearance is constant.
Figure 5:
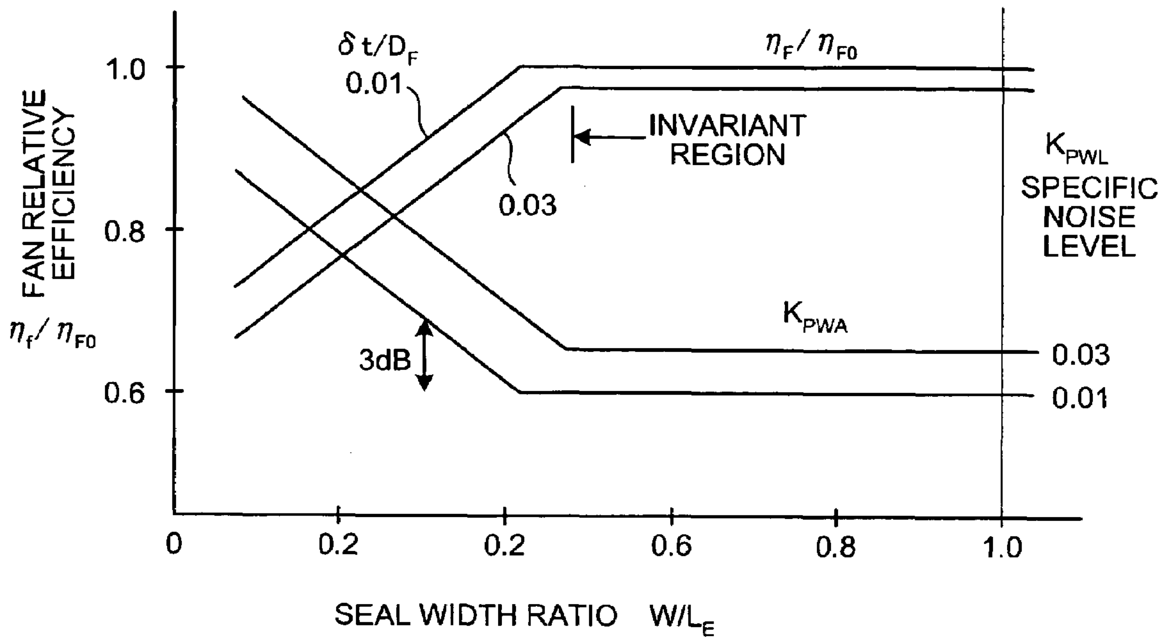
FIG. 5 is a graph showing a relationship among the region of the circumferential outer edge of the vane where the clearance is constant and air blowing efficiency and noise.

FIG. 4 is an explanatory view showing the region of the circumferential outer edge of the vane where a clearance $\delta t$ becomes constant. FIG. 5 is a graph showing a relationship between the region of the circumferential outer edge of the vane where the clearance is constant and the air blowing efficiency and noise, with the horizontal axis indicating $W/L_E$ and the vertical axis indicating a fan relative efficiency $\eta_F/\eta_{F0}$ and a specific noise level $K_{PWL}$. As shown in FIG. 4, the region of the circumferential outer edge of the vane where the clearance is constant is W and a vane chord length of the circumferential outer edge of the vane is $L_E$. Here, W in the figure corresponds to the region 8*f* in FIG. 9.

Referring to FIG. 5, the fan relative efficiency $\eta_F/\eta_{F0}$ continues to increase until the $W/L_E$ axis becomes 0.5, that is, until the region W where the clearance can be kept constant during rotation becomes half of the vane chord length. On the other hand, the noise $K_{PWL}$ continues to decrease until $W/L_E$ becomes 0.5. Even when $W/L_E$ becomes 0.5 or more, there is shown a tendency that the fan relative efficiency and the specific noise level do not change. Even if a ratio $\delta t/D_F$ of the clearance $\delta t$ to a diameter $D_F$ of the rotary vane wheel, which is a definite part, is changed from 0.01 to 0.03, the above-mentioned tendency shows no difference.

From the foregoing, it was found that if the clearance during rotation can be kept constant over 50% chord or more from the downstream end in the circumferential outer edge of the vane 8, an ideal propeller fan in which the fan efficiency increases and the noise decreases can be obtained. Namely, when the rotary vane wheel is arranged axially on the inlet side of the bell mouth shape, intake efficiency of the centripetal flow increases and a high static pressure difference occurring upstream and downstream of the propeller fan can be endured. However, if the rotary vane wheel is located excessively on the inlet side, the above-described W will be small, so that the noise will be easily generated and the fan efficiency will easily decrease. Accordingly, the rotary vane wheel should be arranged at an appropriate axial direction position where both of the effects are balanced.

The fan efficiency $\eta_F$ used for the evaluation in the forgoing is a dimensionless quantity expressed by $\eta_F=(Q\cdot\Delta Ps)/(6.118\cdot W)$, wherein an air volume is Q ($m^3$/min), a pressure is $\Delta Ps$ (mmAq), input of the fan is W (w), and $\eta_{F0}$ is a fan efficiency when $\delta t/D_F$ is 0.01, and $W/L_E$ is 1.0. The specific noise level $K_{PWL}$ is a dimensionless quantity expressed by $K_{PWL}=L_{PWL}-10\ \log(Q\cdot\Delta Ps^2)$ when the noise power level $L_{PWL}$ is $10\ \log\ (P/P_0)$, wherein acoustic output is P (w) and reference acoustic output is $P_0$(w), which is obtained by non-dimensinalizing the noise with a work volume. This quantity is an index often used for noise evaluation of a propeller fan.

Back to FIG. 4, in this vane 8, the circumferential outer edge front vane portion 4, which is the circumferential outer edge end of the vane, is larger by $\delta$ in the span length than any other portion. This portion traverses the bell mouth and plays a role of efficiently collecting the centripetal flow and pushing it downstream. In the vicinity of the circumferential outer edge front vane portion 4, the air broken away at the bell mouth B has a radial velocity vr and a circumferential velocity vt expressed in a rotating coordinate system based on the rotary vane wheel. Accordingly, the broken away air has a velocity component vs obtained by synthesizing vr and vt. The air having this velocity component hits the acting face side of the circumferential outer edge front vane portion 4 to thereby generate small swirls, which poses the noise problem.

Figure 6:
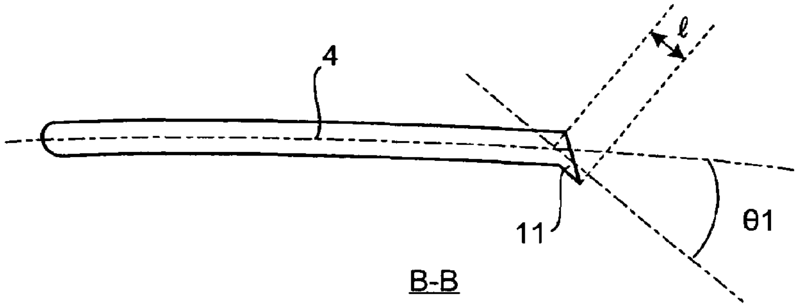
FIG. 6 is a cross-sectional view showing a cross section taken along the line B-B of FIG. 4.

FIG. 6 is a cross-sectional view showing a cross section taken along the line B-B of FIG. 4. In this invention, there is provided a wedge-shaped protrusion 11 which is a circumferential outer edge portion of the vane and is pointed so that a tip end thereof forms a sharp angle at a front edge portion. This wedge-shaped protrusion 11 continues in the vertical direction of the paper face of FIG. 6, and the protrusion forms a triangle pole provided so that the edge portion of the vane 8 served as a ridge line. This wedge-shaped protrusion 11 allows the above-described broken away air to be largely divided, thereby suppressing the occurrence of the noise caused by the occurrence of the fine swirls. Even when the length of l (lower case of L) in FIG. 6 is about 2 or 3 (mm), the wedge-shaped protrusion 11 is effective. An angle $\theta 1$ to a vane center line is about 45 to 80 degrees and the direction of an axis line of the above-described triangle pole is most ideally parallel to the above-described vs.

Figure 7:
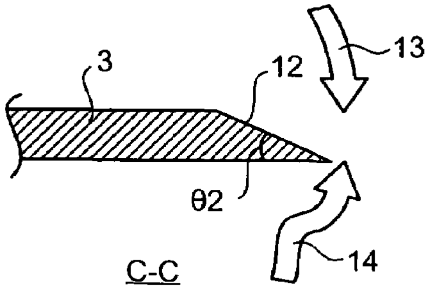
FIG. 7 is a cross-sectional view showing a cross section along the line C-C of FIG. 4.

FIG. 7 is a cross-sectional view showing a cross section along the line C-C of FIG. 4. The cross section of a circumferential outer edge of a vane 3 is as shown in the figure, in which a chamfering 12 is provided only in a negative pressure surface of the vane 3. This is intended to form a contraction flow path in a flow direction 13 in the clearance portion between the shroud and the rotary vane wheel and, on the other hand, to form an orifice flow path in an opposite flow direction 14 (back-flow). The shape of the circumferential outer edge can reduce the back-flow of the air in the clearance portion. Setting an angle of a wedged-shaped portion made by providing the chamfering 12 to about 30 degrees will bring about the above-described effect.

This invention is characterized in that a plate-like protrusion 43 is provided on a surface of each of the vanes 8 on the negative pressure side of a rotary vane wheel 33 (front side of FIG. 1). More particularly, a portion of an air path 36 of a shroud 32 that surrounds the rotary vane wheel 33 in the circumferential direction is generally cylindrical, and the plate-like protrusion 43 of this invention is provided on the vane surface on the negative pressure side of the rotary vane wheel 33 so as to be located on a concentric circle with the cylinder.

Figure 10:
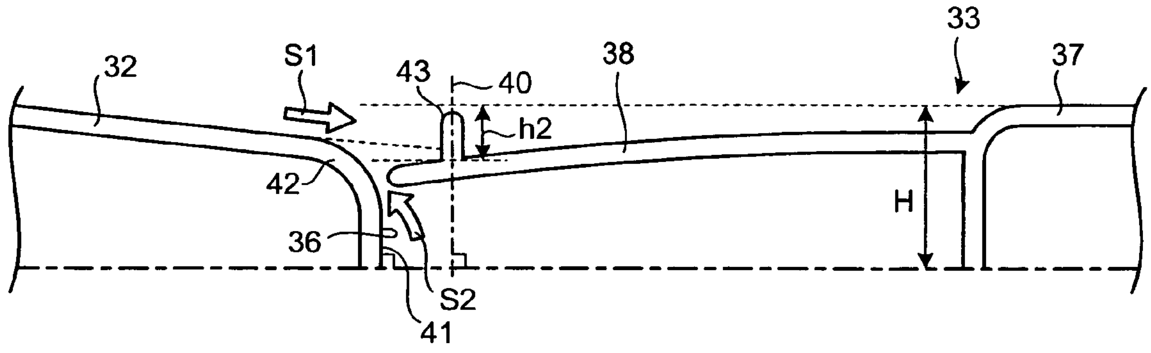
FIG. 10 is a cross-sectional view along the line D-D of FIG. 1, showing a cross-sectional shape of the propeller fan of FIG. 1.

FIG. 10 is a cross-sectional view along the line D-D, showing a cross-sectional shape of the propeller fan of FIG. 1. As shown in the figure, in addition to the foregoing, the plate-like protrusion 43 according to this invention is provided in an axial direction 40 of the rotary vane wheel 33 at not less than such an angle as to be parallel to an inner wall 41 of the portion where the air path 36 of the shroud 32 surrounds the rotary vane wheel 33 in the circumferential direction. In the case of this figure, the plate-like protrusion 43 forms the angle similar to the axial direction 40 of the rotary vane wheel 33 so as to be parallel to the inner wall 41 or so as to be angled to form a taper.

Figure 11:
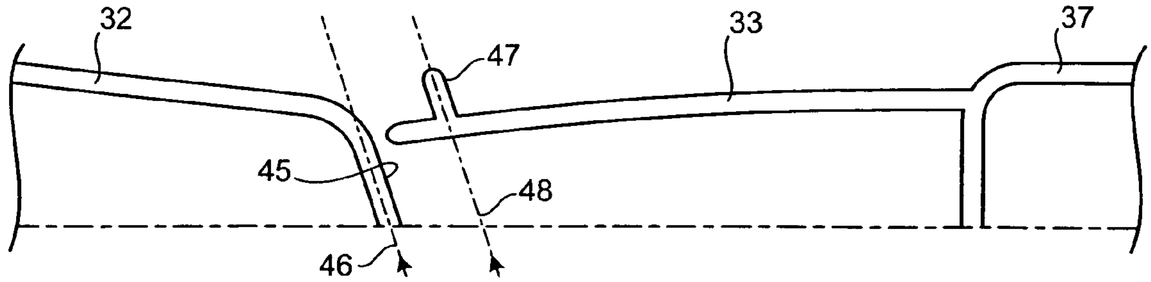
FIG. 11 is a cross-sectional view along the line D-D of FIG. 1, showing a case where a plate-like protrusion is not oriented in the axial direction.

FIG. 11 is a cross-sectional view along the line D-D of FIG. 1, showing a case where a plate-like protrusion is not oriented in the axial direction of the rotary vane wheel. As shown in this figure, a plate-like protrusion 47 is provided at an angle 48 so as to be parallel to an angle 46 of the inner wall of the air path 45. In this manner, the plate-like protrusion 47 may be provided at the angle 48 so as to be parallel to the angle 46 of the inner wall of the air path 45 or even in the case where the angle 46 of the inner wall of the air path 45 is inclined, or it may be oriented in the axial direction 40 of the rotary vane wheel 33, as shown in FIG. 10.

In the propeller fan installed in a narrow place such as the downstream of the in-vehicle heat exchanger where a large dimension in the depth direction cannot be ensured, the direction of the air flowing along a relatively gentle slope at about 80 degrees to 60 degrees with respect to the axial direction of the axial-flow type rotary vane wheel (refer to reference numeral 32 of FIG. 10) is rapidly changed to the axial direction by the rotary vane wheel 33, at the point where the cross section transits from the rectangle to the circle, particularly at the point where the cross section transits from the point of a corner of the rectangle to the circle (in the diagonal direction of the rectangle). At this time, because of inertial force, the air flowing on the gentle slope cannot rapidly change the direction, and thus becomes easily broken away. When broken away, the air will flow centripetally, pass through a vicinity of an outer peripheral portion (annular channel) with maximum air blowing efficiency in the rotary vane wheel and come into a portion near an inner periphery. As a result, the air blowing efficiency is reduced.

In this invention, since the plate-like protrusion 43, 47 is provided from a surface of a negative pressure side vane 38 of the rotary vane wheel 33 so as to be located concentrically with the circle of the air path 36, 45, the protrusion 43, 47 prevents the air broken away from the surface of the shroud 32 from flowing inside. Then, the air is pushed into the downstream in the axial direction of the rotary vane wheel 33 by a nearby vane. Accordingly, the air blowing action in an annular air course formed outside of the plate-like protrusion 43, 47 of the vane is actively performed, whereby the air blowing efficiency is improved.

As shown in FIG. 10 or FIG. 11, since the plate-like protrusion 43, 47 is provided on the vane surface on the negative pressure side of the rotary vane wheel so as to be located concentrically with the air path 36, 45, air resistance of the protrusion during rotation of the rotary vane wheel is small. Thus, the air pushed downstream in the axial direction will also flow smoothly along the circumferential direction of the rotary vane wheel 33 in a space dammed by the plate-like protrusion 43, 47, which improves the air blowing efficiency. The reason why the plate-like protrusion 43, 47 is provided in the axial direction 40, 48 with such an angle as to be parallel or to form a taper with respect to the inner wall 41 of the air path 36, 45 which surrounds the rotary vane wheel 33 in the circumferential direction and is a circle portion is that the angle is minimum required for pushing down the broken away air so as not to flow further inwards.

Figure 12:
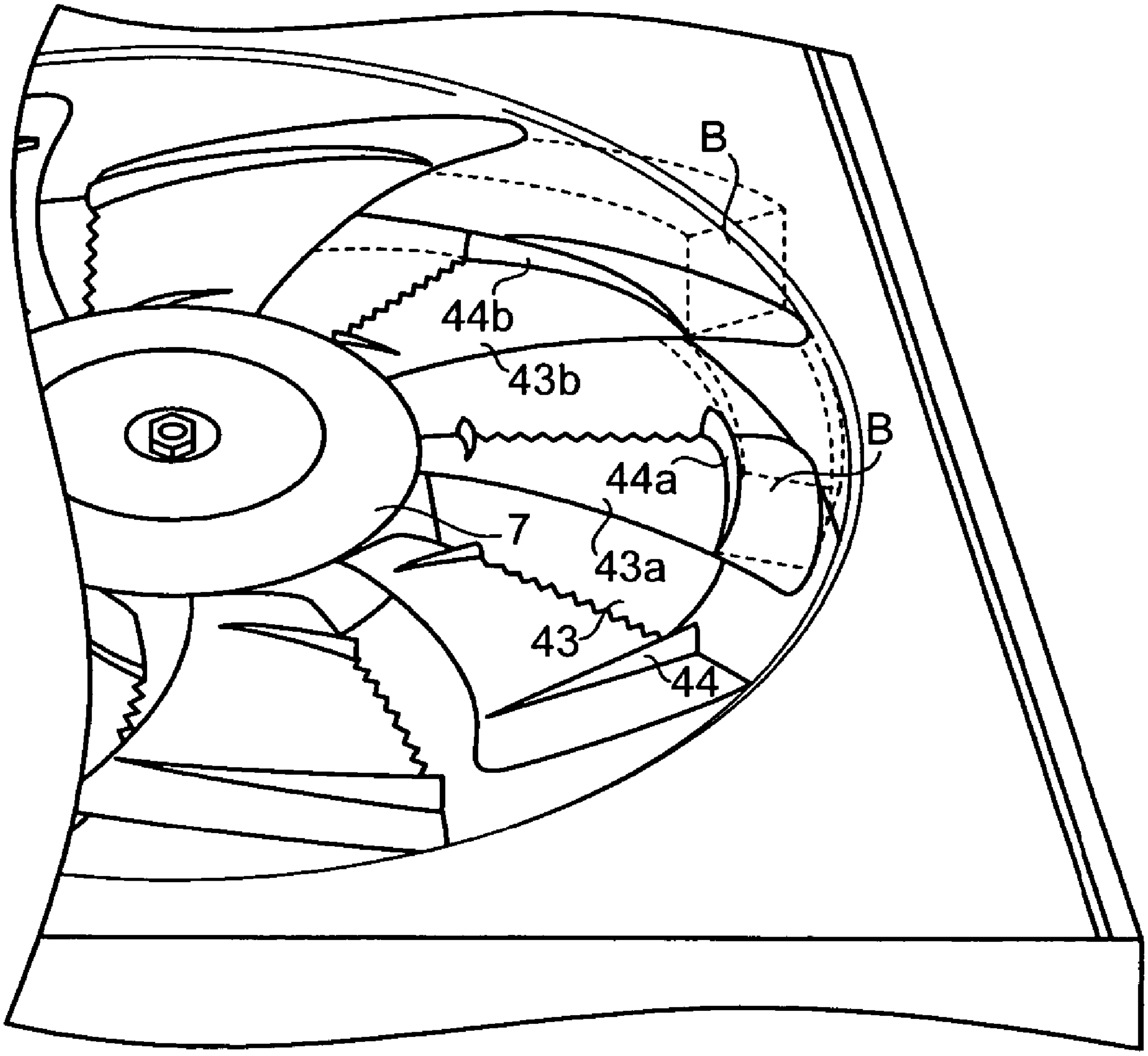
FIG. 12 is an explanatory view showing an image of an annular air course formed outside of the plate-like protrusion.

FIG. 12 is an explanatory view showing an image of an annular air course formed outside of the plate-like protrusion. As shown in this figure, an annular air course B formed outside of the plate-like protrusion 44, 44*a*, 44*b* is a region where the air is pushed out most efficiently. Even if the plate-like protrusion 44, 44*a*, 44*b* is provided on a circle at the position of 80% of a vane length, the work of sending the air has an efficiency of 50% or more of the entire rotary vane wheel. Therefore, according to this invention, the provision of the plate-like protrusion 44, 44*a*, 44*b* leads to the maximum use of the annular air course B, and thus, is extremely useful.

Back to FIG. 10, in the above-described annular air course, a flow S1 in which the air having flown along the gentle slope as the air path of the shroud 32 rapidly changes the direction, thereby broken away, and a flow S2 in which the air flows backwards from the downstream with a higher static pressure than the upstream through the clearance between the vane 38 and the air path 42 come onto the surface of the vane 38 on the negative pressure side. However, since there is the plate-like protrusion 43, the flows do not go further inwards on the vane 8 but are efficiently pushed downstream by the rotary vane 38. In order to ensure this action, it is preferable that the plate-like protrusion 43 is provided toward the axial direction. However, in the case where the air path 45 is a circular cone shape having a taper as shown in FIG. 11, the probability of the air broken away due to the rapid change in course is reduced, and thus the plate-like protrusion 47 may be provided at an angle parallel to the air path 45 as in FIG. 11.

In terms of ensuring the annular air course in which the flow S1 of the broken away air is efficiently pushed downstream, it is preferable that a height h2 of the plate-like protrusion 43 is as large as possible. Also, in terms of ensuring the annular air course in which the flow S2 of the air flowing backwards from the downstream through the clearance between the vane 38 and the air path 42 is efficiently pushed downstream, it is preferable. However, the heat exchanger is normally arranged upstream of the rotary vane wheel 33 in the vicinity, and thus, taking into consideration the safety of avoiding interference, the height is advantageously set to a height of a hub 37 of the rotary vane wheel 33 or lower.

Figure 13:
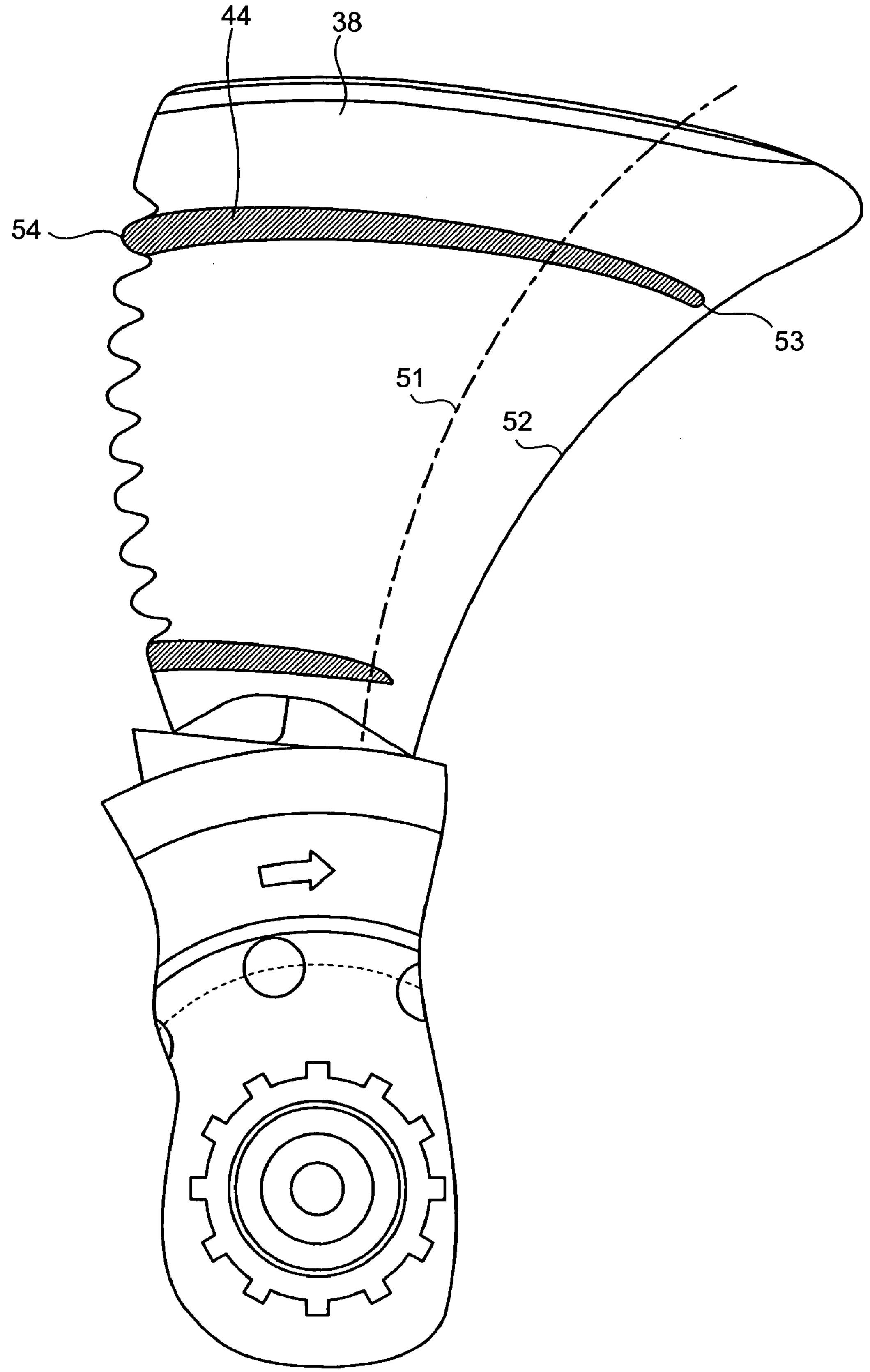
FIG. 13 is a front view showing a length of the plate-like protrusion in a surface of the vane of the rotary vane wheel.

FIG. 13 is a front view showing a length of the plate-like protrusion in the surface of the vane of the rotary vane wheel. If a length from a vane front edge 53 to a vane rear edge 54 is 100% chord (100% vane chord length), it is ideal that the plate-like protrusion 44 is provided so that the protrusion starts at a position of 0 to 20% chord from the vane front edge 53 (between reference numerals 52 and 51) and the height smoothly increases up to the vane rear edge 54. The static pressure in the vane surface increases toward the vane rear end 54 and the tendency that the air broken away from the shroud and the air flowing backwards through the tip clearance of the vane end from the downstream burst into and disturb becomes strong. Accordingly, it is preferable that the height of the plate-like protrusion 44 is increased toward the vane rear end to ensure the annular air course. The smoothness of the change in height is intended to prevent the air flow from being disturbed. Furthermore, mixing and diffusion of the air gradually spread as it is closer to the rear edge, which is also addressed.

Figure 14:
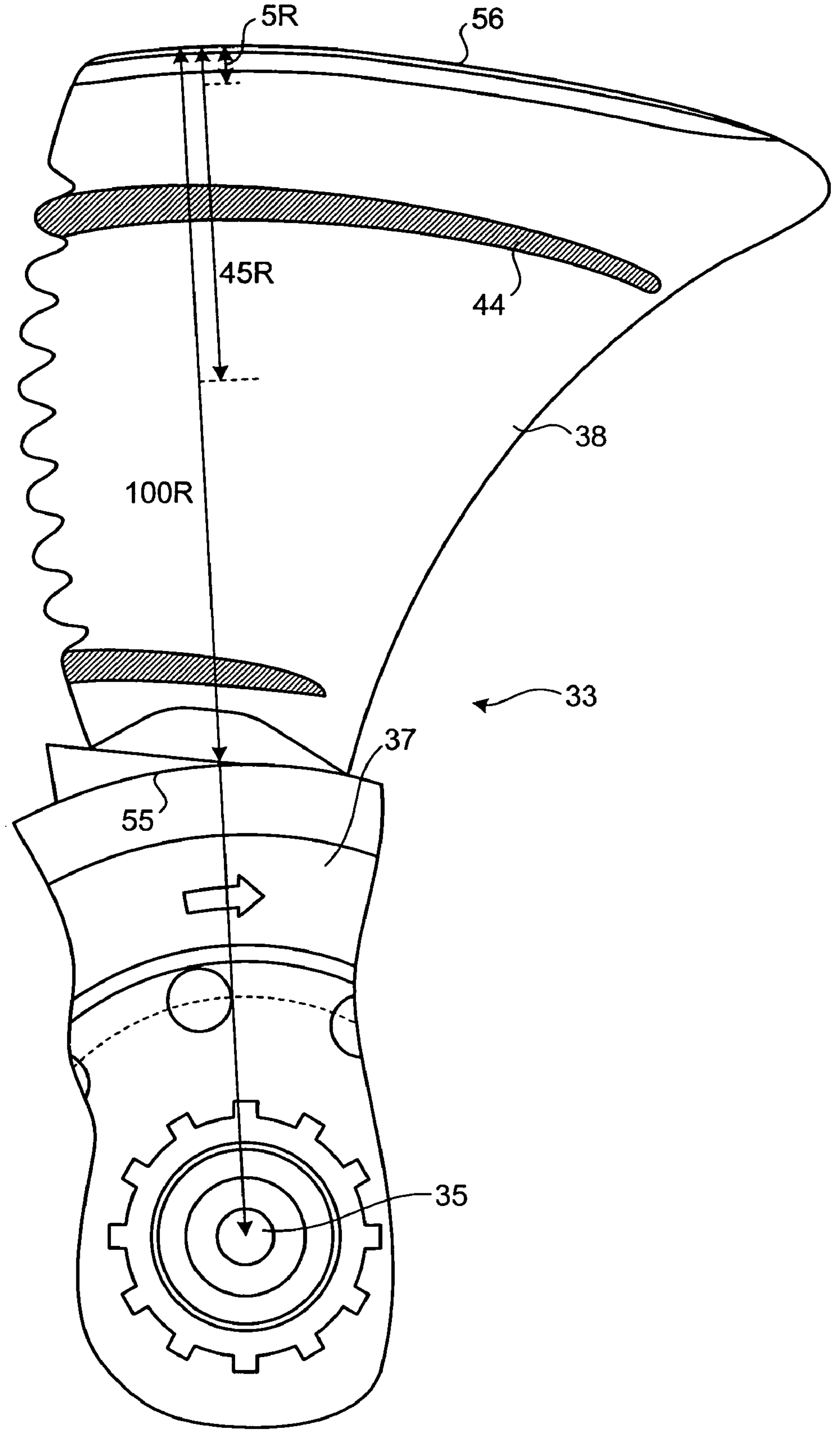
FIG. 14 is a front view showing a position of the plate-like protrusion in a span direction in the surface of the vane of the rotary vane wheel.

FIG. 14 is a front view showing a position of the plate-like protrusion in the span direction in the surface of the vane of the rotary vane wheel. If a length from an outer periphery 55 of the hub 37 of the rotary vane wheel 33 to a vane outer edge 56 is 100 R, it is preferable that the plate-like protrusion 44 is provided in a range from the vane outer edge 56 to 5 R to 45 R. Since the vane 38 has a higher circumferential velocity at the outer edge, the work of efficiently thrusting the air is enabled. Accordingly, the plate-like protrusion 44 is advantageously provided in a region of at minimum 5 R to 50 R or if possible, to 45 R from the outer edge. This is because if the plate-like protrusion 44 is provided inside of the above-mentioned region, the efficiency pushing in the air extremely decreases.

As described above, in the propeller fan according to this invention, the centripetal flow of the air forcibly diffracted by the shroud and the rotary vane wheel is suppressed ingeniously without increasing the dimension in the depth direction. Furthermore, the air can be caused to flow rearwards by the portion of the rotary vane wheel with a high air blowing efficiency. These improve the air blowing efficiency of the entire propeller fan.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A propeller fan comprising:

a plurality of vanes disposed radially around a hub; and a shroud disposed surrounding the plurality of vanes to form a flow passage in a bell mouth shape whose inlet has a rectangular section and whose outlet has a circular section, wherein a clearance between a circumferential outer edge of a vane and an inner wall of the shroud is constant over a region of more than 50% chord length from a trailing edge of the vane at the circumferential outer edge, and wherein a span length of a portion of the vane that traverses the bell-mouth-shaped portion is larger than a span length of a portion of the vane that does not traverse the bell-mouth-shaped portion.

2. The propeller fan according to claim 1, wherein except in a portion of the circumferential outer edge where the vane has a largest span length, the vane is cut off a part of the circumferential outer edge on a pressure surface thereof to form a wedge, while in the portion of the circumferential outer edge, the wedge is deformed to a wedge-like protrusion on a pressure surface of the vane.

3. The propeller fan according to claim 1, wherein plate-like protrusions start at a position of 0 to 20% chord from a leading edge of the vane and a height thereof smoothly increases to a trailing edge of the vane.

4. The propeller fan according to claim 1, wherein plate-like protrusions are provided in a range of 5% to 45% of a distance from an outer periphery of the hub to the circumferential outer edge of the vane.

5. The propeller fan according to claim 1, wherein heights of plate-like protrusions are equal to, or lower than a height of the hub.

6. The propeller fan according to claim 1, wherein plate-like protrusions are concentrically disposed.

* * * * *